(12) United States Patent
Flamm

(10) Patent No.: US 12,479,045 B2
(45) Date of Patent: Nov. 25, 2025

(54) METHOD FOR THE LASER WELDING OF A WORKPIECE, WITH BEAM SHAPING BY MEANS OF AN AXICON, AND OPTICAL APPARATUS

(71) Applicant: TRUMPF Laser—und Systemtechnik GmbH, Ditzingen (DE)

(72) Inventor: Daniel Flamm, Ludwigsburg (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 846 days.

(21) Appl. No.: 17/742,494

(22) Filed: May 12, 2022

(65) Prior Publication Data

US 2022/0266387 A1 Aug. 25, 2022

Related U.S. Application Data

(63) Continuation of application No. PCT/EP2020/082359, filed on Nov. 17, 2020.

(30) Foreign Application Priority Data

Nov. 18, 2019 (DE) ...................... 10 2019 217 754.9

(51) Int. Cl.
*B23K 26/073* (2006.01)
*B23K 26/06* (2014.01)
*B23K 26/24* (2014.01)

(52) U.S. Cl.
CPC ...... *B23K 26/0734* (2013.01); *B23K 26/0652* (2013.01); *B23K 26/0665* (2013.01); *B23K 26/24* (2013.01)

(58) Field of Classification Search
CPC ............ B23K 26/0734; B23K 26/0652; B23K 26/0665; B23K 26/24
USPC ..................................................... 219/121.64
See application file for complete search history.

(56) References Cited

U.S. PATENT DOCUMENTS 3,419,321 A * 12/1968 Barber ............... B23K 26/0734
219/121.75
4,887,592 A * 12/1989 Loertscher ............. G02B 5/001
606/5
4,997,250 A * 3/1991 Ortiz, Jr. ................ G02B 27/09
219/121.75

(Continued)

FOREIGN PATENT DOCUMENTS

CN 103299232 A 9/2013
CN 104858547 A 8/2015

(Continued)

*Primary Examiner* — Jimmy Chou
(74) *Attorney, Agent, or Firm* — LEYDIG, VOIT & MAYER, LTD.

(57) ABSTRACT

A method for laser welding of a workpiece includes providing a laser beam using a laser beam source, collimating the laser beam using a collimation optical unit, reshaping the collimated laser beam using a reshaping optical unit, and focusing the reshaped laser beam using a focusing unit. The focused laser beam is directed onto the workpiece to be welded. The reshaping optical unit has a first partial region in which at least one part of at least one axicon is embodied. At least a part of a beam cross-section of the collimated laser beam is directed onto the partial region of the reshaping optical unit.

12 Claims, 10 Drawing Sheets

(56) References Cited

U.S. PATENT DOCUMENTS

| | | | | |
|---|---|---|---|---|
| 5,256,853 | A * | 10/1993 | McIntyre | B23K 26/0652 219/121.75 |
| 7,285,744 | B2 * | 10/2007 | Chen | B29C 65/1696 219/121.75 |
| 8,993,924 | B2 * | 3/2015 | Ryu | B23K 26/0736 219/121.72 |
| 10,444,521 | B2 * | 10/2019 | Rudolf | H10H 20/855 |
| 11,633,805 | B2 * | 4/2023 | Kiessling | B23K 26/103 219/121.67 |
| 11,648,623 | B2 * | 5/2023 | Gollier | B23K 26/0738 219/121.75 |
| 11,686,889 | B2 * | 6/2023 | Filkins | B29C 64/268 219/121.65 |
| 2008/0088959 | A1 * | 4/2008 | Ullman | B23K 26/0734 359/861 |
| 2009/0294412 | A1 * | 12/2009 | Kono | B23K 26/0734 219/129 |
| 2010/0221898 | A1 * | 9/2010 | Nishida | B23K 26/0732 219/121.73 |
| 2013/0223792 | A1 | 8/2013 | Huber et al. | |
| 2014/0003456 | A1 | 1/2014 | Mikliaev et al. | |
| 2014/0131327 | A1 * | 5/2014 | Nishitani | B23K 26/0734 219/121.63 |
| 2015/0014889 | A1 * | 1/2015 | Goya | B23K 26/0652 219/121.72 |
| 2016/0059350 | A1 * | 3/2016 | Schoenleber | B23K 26/04 219/121.81 |
| 2016/0089749 | A1 * | 3/2016 | Mori | G02B 27/40 219/121.75 |
| 2017/0371166 | A1 | 12/2017 | Rudolf et al. | |
| 2018/0021888 | A1 * | 1/2018 | Liu | B23K 26/035 219/121.64 |
| 2020/0156189 | A1 * | 5/2020 | Rataj | B23K 26/0652 |
| 2020/0198054 | A1 | 6/2020 | Rudolf | |
| 2020/0376603 | A1 | 12/2020 | Ortner et al. | |

FOREIGN PATENT DOCUMENTS

| | | | | |
|---|---|---|---|---|
| CN | 107646093 A * | 1/2018 | | B23K 26/0652 |
| CN | 110227884 A | 9/2019 | | |
| CN | 110435160 A | 11/2019 | | |
| DE | 10261422 A1 | 7/2004 | | |
| DE | 102010003750 A1 | 10/2011 | | |
| DE | 102016107595 A1 | 11/2017 | | |
| DE | 102017001658 A1 | 8/2018 | | |
| EP | 2202545 A1 | 6/2010 | | |
| EP | 2730363 A1 * | 5/2014 | | B23K 26/0648 |
| JP | 2008260035 A | 10/2008 | | |
| WO | WO 2017186681 A1 | 11/2017 | | |
| WO | WO 2018219710 A1 | 12/2018 | | |
| WO | WO 2019158488 A1 | 8/2019 | | |

\* cited by examiner

METHOD FOR THE LASER WELDING OF A WORKPIECE, WITH BEAM SHAPING BY MEANS OF AN AXICON, AND OPTICAL APPARATUS

CROSS REFERENCE TO RELATED APPLICATIONS

This application is a continuation of International Application No. PCT/EP2020/082359 (WO 2021/099299 A1), filed on Nov. 17, 2020, and claims benefit to German Patent Application No. DE 10 2019 217 754.9, filed on Nov. 18, 2019. The aforementioned applications are hereby incorporated by reference herein.

FIELD

Embodiments of the invention relate to a method for laser welding of a workpiece.

BACKGROUND

DE 102 61 422 A1 discloses a method for laser welding. For example, laser welding is a joining method which enables workpiece parts of a workpiece to be permanently connected to one another. Laser welding is usually used if the intention is to carry out welding at a high welding speed, with a narrow and slender weld seam shape and with low thermal warpage. During laser welding, energy is fed in via a laser beam.

In order to obtain weld seams with particularly high quality, it is known to use beam shaping on the laser beam.

DE 102 61 422 A1 proposes splitting a collimated laser beam between two partial beams by means of a beam splitter and focusing these partial laser beams with mutually offset operating points.

DE 10 2010 003 750 A1 proposes coupling a laser beam into a double-clad fiber in order to obtain at the output of the double-clad fiber a laser beam with a filled circle profile in accordance with an inner fiber core and a ring profile in accordance with an outer fiber core. The laser beam profile can be used for laser welding, wherein an adaptation to the respective application can be effected.

The provision of a multi-clad fiber, for instance a double-clad fiber, and also the coupling of the laser beam into the multi-clad fiber are comparatively complex and expensive.

SUMMARY

Embodiments of the present invention provide a method for laser welding of a workpiece. The method includes providing a laser beam using a laser beam source, collimating the laser beam using a collimation optical unit, reshaping the collimated laser beam using a reshaping optical unit, and focusing the reshaped laser beam using a focusing unit. The focused laser beam is directed onto the workpiece to be welded. The reshaping optical unit has a first partial region in which at least one part of at least one axicon is embodied. At least a part of a beam cross-section of the collimated laser beam is directed onto the partial region of the reshaping optical unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
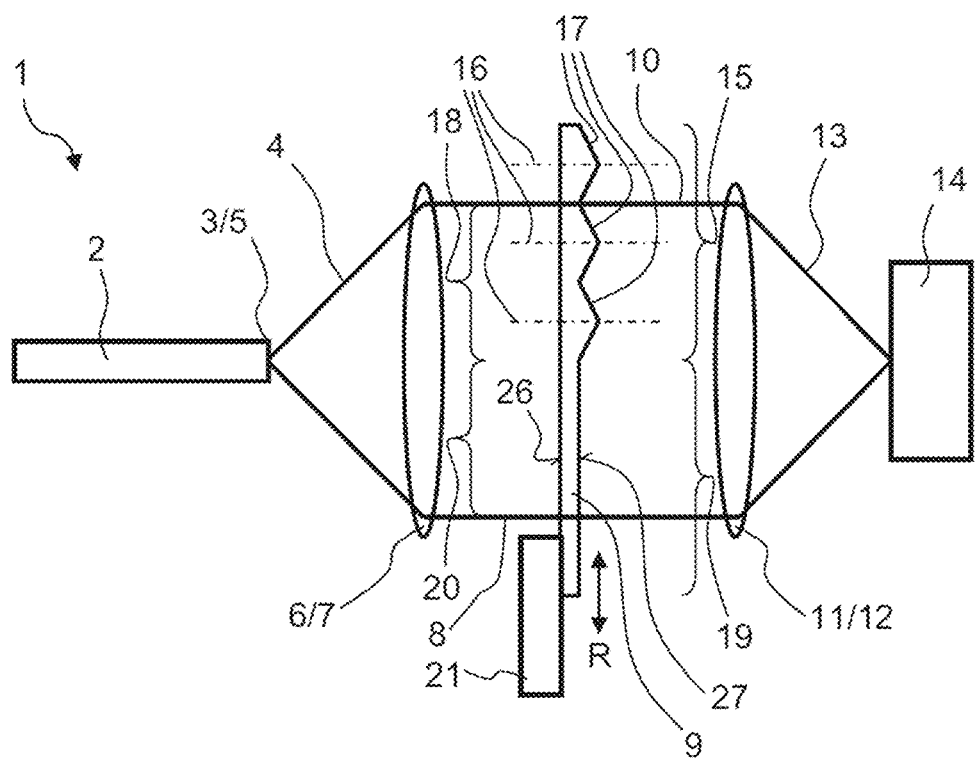
FIG. 1a shows a schematic longitudinal section of an apparatus for carrying out the method according to an embodiment of the invention.

Embodiments of the invention provide a method for laser welding which enables beam shaping to be effected with little outlay and cost-effectively, in particular in order to obtain a good quality of a weld seam.

According to an embodiment of the invention, a method is provided, wherein the reshaping optical unit has at least one partial region in which at least one part of at least one axicon is embodied, and wherein the collimated laser beam is directed at least with a part of its beam cross-section onto said partial region of the reshaping optical unit.

According to some embodiments of present invention, during laser welding, the laser beam is subject to beam shaping by using at least one axicon (or a part of an axicon). By means of the axicon, the collimated laser beam can be focused into a ring surface (or a part of a ring surface) on a workpiece. Said ring surface can be utilized in the welding process and have a favorable influence on the welding process, in particular reduce the melt pool dynamics and reduce for example spatter formation and/or undulation of the weld seam.

An axicon is a comparatively cost-effective optical component which can be utilized with a simple optical fiber. In particular, an expensive multi-clad fiber or complex coupling of the laser beam to a specific partial fiber (or a plurality of partial fibers) of the multi-clad fiber is not necessary for focusing the laser beam (at least partly) into a ring surface.

The axicon or the part thereof can be embodied as refractive or diffractive. A refractive axicon comprises a surface embodied in the shape of a cone lateral surface (conical lateral surface); the material of the axicon is transparent to the laser radiation, but refracts light. The axicon angle (here cone angle) determines the direction in which the ring surface is produced; the width of the ring surface is determined by way of the width of the collimated laser beam incident on the axicon. It should be noted that the axicon can project from a substrate, or else can be worked into a substrate as a depression ("inverse axicon") A diffractive axicon comprises concentric ring regions arranged periodically and having in each case cone lateral surfaces (conical lateral surfaces) rising or falling in a radial direction, typically set up as a rotationally symmetrical (radially symmetrical) sawtooth grating; the material of the axicon is in turn transparent to the laser radiation, but diffracts light. The grating period determines the diffraction angle by way of the so-called grating equation, and the orientation of the grating defines the local direction of the diffracted light perpendicular to the grating structure; this results overall in the direction in which the associated ring surface is generated. To a small-angle approximation, in the case of the diffractive axicon, the aperture angle γ thereof results from the grating period P by way of $P=\lambda/((n-1)*\gamma)$, where n: refractive index of the axicon material, and λ: (mean) wavelength of the laser light. It should furthermore be noted that the grating period correlates with the slope angle of the sawtooth grating and the phase jump set up at the sawtooth steps. Smaller grating periods result in larger axicon angles, and smaller grating periods result in larger diffraction angles.

A (complete) axicon is embodied rotationally symmetrically, in principle, and occupies a circular area.

In one preferred variant of the method according to an embodiment of the invention, it is provided that the reshaping optical unit is embodied in such a way, and the collimated laser beam is directed onto the reshaping optical unit in such a way, that the focused laser beam has
  a core focus portion, in particular wherein the core focus portion is provided by laser radiation not diffracted or not refracted at the reshaping optical unit, and
  at least one ring focus portion surrounding the core focus portion on a ring surface or a part of a ring surface, in particular wherein the ring focus portion is provided by laser radiation diffracted or refracted at the axicon at the reshaping optical unit. A beam profile with a (circular surface-shaped) core focus portion and at least one (annular) ring focus portion is advantageous in many applications of laser welding in order to obtain a calm melt pool with little spatter formation and small undulation of the resulting weld seam, in particular wherein the laser welding is effected in the regime of deep welding (with a vapor capillary arising). The focused laser beam advantageously has a double top hat profile; typically the intensity of the laser radiation is approximately constant within the core focus portion and is likewise approximately constant in the region of the ring focus portion (or of a respective ring focus portion). A plurality of ring foci can be attained by way of a plurality of axicon angles and/or grating periods—different in a radial direction—of zones of ring regions of the axicon. A core focus portion can be provided the most simply by only a part of the beam cross-section of the laser beam being allotted to the (at least one) axicon (or a part of an axicon), and a further part of the beam cross-section not being allotted to the (at least one) axicon (or the part of the axicon). Alternatively, it is also possible for the axicon to shape the incident laser beam only incompletely, in particular to diffract it incompletely.

Preference is given to a further development of this variant in which an integrated laser power of the core focus portion is at least 25% of the total laser power of the focused laser beam. This has proved worthwhile for attaining a good seam quality for many workpiece materials, particularly in the deep welding regime. The integrated laser power of the core focus portion is usually between 25% and 60%, preferably between 30% and 50%, of the total laser power.

Preference is also given to a further development which provides for the reshaping optical unit to have a further partial region adjacent to the partial region in a direction R, and wherein for the purpose of setting a distribution of the laser power between the core focus portion and the at least one ring focus portion the reshaping optical unit is moved relative to the collimated laser beam in the direction R. This is a structurally simple cost-effective and reliable possibility for splitting the power distribution of the laser radiation between the core focus portion and the (at least one) ring focus portion, in particular also splitting it differently again and again depending on the application.

One variant preferably provides for the partial region to have a diffractive axicon, in particular wherein the collimated laser beam illuminates the diffractive axicon with its entire beam cross-section, and in particular wherein the collimated laser beam illuminates the diffractive axicon rotationally symmetrically around a center of the axicon, and for the diffractive axicon to subject the collimated laser beam to a reduced phase modulation. By way of the reduced phase modulation, an undiffracted or undeflected core focus portion is produced ("0th order regulation"). In this case, it is possible to set a fixed power distribution between a ring focus portion and a core focus portion; it is not necessary to split the beam cross-section of the (collimated) laser beam in the reshaping optical unit for the power distribution in a specific manner, which simplifies the method and the associated optical set-up.

In one preferred further development of this variant, for the purpose of setting up the reduced phase modulation the diffractive axicon has concentric ring regions arranged periodically around a center of the axicon and having in each case cone lateral surfaces rising or falling in a radial direction, wherein a phase jump PHS of the less than a is set up in each case at a step from one concentric ring region to the next concentric ring region, in particular with $\pi/2 \leq PHS \leq 3\pi/2$, preferably 2.5 rad$\leq$PHS$\leq$3 rad. The "incomplete" phase jump at a respective step results in an incomplete diffraction of the (collimated) laser beam into the ring focus portion, and accordingly a remaining portion of the laser beam or of the laser power into the core focus portion. The phase jump PHS results from the height H of the step (in the beam propagation direction), the wavelength λ of the laser radiation and the difference Δn in refractive index between the material of the axicon (usually glass) and the surroundings (usually air) (at the wavelength λ of the laser radiation), where PHS=$2\pi*\Delta n*H/\lambda$. A phase jump PHS$\leq$3 rad results in a comparatively large portion of laser power for the core focus region, which is usually preferred during laser welding for a good seam quality. Without reduced phase modulation, the phase jump at a step of a diffractive axicon would be in each case $2\pi$. The power portion in the core portion is determined by way of the etching depth (height H) in comparison with the wavelength of the laser radiation. The following approximately holds true for the power portion $P_0$, which passes a grating with the step height (grating depth) H without being modulated (zeroth order power portion, corresponding to the power portion of the core portion):

$$P_0(H) \approx P\left\{0, 5\left[1 + \cos\left(\frac{\pi H}{H_{max}}\right)\right]\right\}^{1,3}$$

with the maximum grating depth $H_{max}$ where $H_{max}=\lambda/(n-1)$, further where n: Refractive index of the axicon material, and where P: Total laser power, and where the step height H is from 0 to $H_{max}$. If H has a value of $H_{max}$, then the phase jump at a respective step is $2\pi$ and all light is modulated, and $P_0=0$. If H has a value of zero, then a grating is no longer present, and $P_0=P$. In the context of this further development, the step height H is chosen in between, i.e. where $0<H<H_{max}$.

In one preferred variant, it is provided that the partial region of the reshaping optical unit has a multiplicity of axicons arranged next to one another, that the part of the beam cross-section of the collimated laser beam wholly or partly illuminates a plurality of axicons of the partial region, and that a further part of the beam cross-section of the collimated laser beam remains uninfluenced by the axicons. By illuminating a plurality of axicons with a part of the beam cross-section, typically for the most part wholly in each case, or else partly for different respective illuminated angle sections of the axicons, it is possible to achieve a substantially uniform illumination of the ring focus portion or of the ring surface on the workpiece. The core focus portion can be illuminated with the further part of the beam cross-section. The splitting of the beam cross-section between the (first) part and the further (second) part determines the power distribution, optionally adjustably by way of an adjusting device of the reshaping optical unit relative to the laser beam. The axicons in the partial region can be arranged on a grid (typically wherein all the axicons are of the same size), in particular on a cartesian grid or a hexagonal grid, or else can be arranged randomly (wherein the axicons can be of the same size or else of different sizes). With the use of a plurality of axicons ("axicon array") the axicons are typically applied on a common substrate.

In one preferred development of this variant, the axicons arranged next to one another are embodied as refractive axicons. This is possible particularly simply from a structural standpoint.

In another, preferred variant, it is provided that the partial region has only a part of an axicon, that the part of the beam cross-section of the collimated laser beam wholly or partly illuminates the part of the axicon, and that a further part of the beam cross-section remains uninfluenced by the part of the axicon. By wholly or partly illuminating (only) the part of an axicon, it is possible for the (first) part of the beam cross-section to be focused into a corresponding part of a ring surface (i.e. into an incomplete ring surface); in laser welding applications this can be advantageous for the seam quality or spatter formation. The core focus can be illuminated by way of the further (second) part of the beam cross-section. In this variant, too, power splitting is possible by way of the relative position of reshaping optical unit and collimated laser beam.

In one preferred further development of this variant, the part of the axicon encompasses a sector-shaped part of the axicon, preferably wherein the sector-shaped part encompasses an angle range of between 90° and 270°, particularly preferably between 130° and 230°, very particularly preferably of 180°. As a result, a corresponding sector-shaped part of a ring surface or a corresponding ring focus can be illuminated ("ring segment focus"); the size of the axicon angle segment (axicon angle range) determines the size of the segment focus (ring surface angle range). With an angle range of 180°, it is possible to set up a half-ring-shaped ring focus, which typically leads the core focus in the feed direction in the welding process, and prepares the melt pool as a result, such that the core focus can produce a vapor capillary in already melted workpiece material. With an angle range of 180°, i.e. a half-ring-shaped ring focus portion, it is additionally possible to attain particularly simply a power distribution between the ring focus portion and the core focus portion by relative displacement of reshaping optical unit and laser beam.

What is also advantageous is a variant which provides that the partial region comprises only one axicon or only a part of an axicon, the part of the beam cross-section which is directed onto the partial region illuminates the axicon or the part of the axicon rotationally symmetrically, and wherein a further part of the beam cross-section remains uninfluenced by the axicon or the part of the axicon. The rotationally symmetrical illumination of the axicon (or of a typically rotationally symmetrical and/or ring-shaped part of an axicon) with the (first) part of the beam cross-section produces a completely (circumferentially) illuminating ring surface or a completely (circumferentially) illuminated ring focus. The further (second) part of the beam cross-section produces the core focus. In this variant, a particularly compact construction of the reshaping optical unit can be attained; it is well suited to comparatively narrow ring foci, in particular.

A further development of this variant provides for the further part of the beam cross-section to comprise a region radially within a ring-shaped part of an axicon and/or a region radially outside the axicon or the part of the axicon. As a result, the core focus portion can be set up on a small structural space in a simple manner.

Embodiments of the present invention also include an optical apparatus for the laser welding of a workpiece, in particular embodied for carrying out a method as claimed in any of the preceding claims,
Comprising
  a laser beam source for providing a laser beam,
  a collimation optical unit for collimating the provided laser beam of the laser beam source,
  a reshaping optical unit for reshaping the collimated laser beam, and
  a focusing optical unit for focusing the reshaped laser beam and for directing the focused laser beam onto the workpiece to be welded,
which optical apparatus is distinguished in that the reshaping optical unit has at least one partial region in which at least one part of at least one axicon is embodied. By means of the at least one axicon or part of an axicon, it is possible to set up beam reshaping with production of a ring focus simply and cost-effectively. Moreover, it is easily possible additionally to produce a core focus. By means of the beam reshaping, it is possible to effect an adaptation to a specific laser welding application, in particular for optimizing the quality of the weld seam, for instance with regard to mechanical strength or undulation, or else for minimizing spatter formation during the welding process. The optical apparatus can be used in particular for carrying out an above-described method according to an embodiment of the invention.

One preferred embodiment of the optical apparatus according to the invention provides for the reshaping optical unit to be embodied with
  in the partial region a diffractive axicon, embodied for a reduced phase modulation of the collimated laser beam, in particular having ring regions which are concentric with respect to a center of the axicon and have in each case cone lateral surfaces rising or falling in a radial direction, wherein a phase jump PHS of less than $2\pi$ is set up in each case at a step from one concentric ring region to the next concentric ring region, or
  in the partial region, a multiplicity of axicons arranged next to one another and a further partial region without axicons, or
  in the partial region only a part of an axicon and a further partial region without axicons, in particular wherein the part of the axicon is a sector-shaped part of the axicon, or
  in the partial region only one axicon or only a part of an axicon, wherein the optical apparatus is set up such that the collimated laser beam illuminates the axicon or the part of the axicon rotationally symmetrically with a part of its beam cross-section, and a further part of the beam cross-section of the collimated laser beam remains uninfluenced by the axicon or the part of the axicon. This embodiments makes it possible in a simple manner to obtain, besides the ring focus portion, also a core focus portion in the focused laser beam directed onto the workpiece.

Preference is likewise given to an embodiment which provides that the reshaping optical unit comprises a further partial region without axicons, which is adjacent to the partial region in a direction R, and wherein an adjusting device, in particular motorized adjusting device, is provided, by which the reshaping optical unit is adjustable relative to the collimated laser beam at least in the direction R. The adjusting device or a corresponding relative displacement of reshaping optical unit and collimated laser beam makes it possible to set the power portions of the laser beam that are allotted to a (at least one) ring focus and to a core focus and to adapt them to the specific processing application.

Moreover, preference is given to an embodiment in which within at least one axicon the axicon has a plurality of axicon angles and/or a plurality of grating periods of a ring region profile. As a result, it is possible to produce a plurality of ring foci, as a result of which the beam profile of the laser beam can be adapted even further to a specific processing application. It should be noted that a plurality of axicon angles or a plurality of grating periods of a ring region profile can in particular also be used in the respective axicons of an axicon array, particularly if the axicon array forms a regular grid of axicons. A respective unit cell of the grid then produces contributions to a plurality of ring foci (or parts thereof) in accordance with the plurality of axicon angles or grating periods.

Further advantages of the invention are evident from the description and the drawing. Likewise, according to the invention, the features mentioned above and those that will be explained still further can be used in each case individually by themselves or as a plurality in any desired combinations. The embodiments shown and described should not be understood as an exhaustive enumeration, but rather are of exemplary character for outlining the invention.

FIG. 1a shows in a schematic longitudinal section one exemplary embodiment of an optical apparatus 1 for the invention, and in particular for carrying out a method according to an embodiment of the invention for laser welding; this set-up can correspondingly be applied to all further embodiments and variants presented.

A laser beam 4 emerges from a fiber-optic cable 2 at one end 3. In this respect, the end 3 of the fiber-optic cable 2 serves as a laser beam source 5. The provided laser beam 4 is collimated by means of a collimation optical unit 6, here a single collimation lens 7, as a result of which a collimated laser beam 8 is obtained. The collimated laser beam 8 passes through a reshaping optical unit 9, which is transparent to the laser radiation and which reshapes the collimated laser beam 8, typically by light refraction or light diffraction, as a result of which a reshaped laser beam 10 is obtained. The reshaped laser beam 10 passes through a focusing optical unit 11, here a single focusing lens 12, as a result of which a focused laser beam 13 is obtained. The focused laser beam 13 is directed onto a workpiece 14 to be welded, typically as the joint of two workpiece parts of the workpiece 14 to be welded. In this case, the focus of the focused laser beam 13 typically lies on or close to the surface of the workpiece 14.

According to an embodiment of the invention, the reshaping optical unit 9 has a partial region 15 in which at least one axicon or at least one part of an axicon is embodied. In the embodiment shown, three axicons 17 lying next to one another are embodied in the partial region 15 in the longitudinal section shown. The collimated laser beam 8 is directed at least with a part 18 of its beam cross-section onto said partial region 15 of the reshaping optical unit 9. In the embodiment shown, two of the three axicons 17 are illuminated by the part 18 of the beam cross-section in the longitudinal section. The here refractive axicons 17 have in each case a surface shaped as a conical lateral surface on the rear side 27 of the reshaping optical unit 9, the respective conical lateral surface being situated rotationally symmetrically about a respective local cone axis 16; the cone axis 16 lies parallel to the beam propagation direction of the collimated laser beam 8. The reshaping optical unit 9 is typically produced from glass.

In the embodiment shown, the reshaping optical unit 9 also has a further partial region 19, which is embodied without axicons, here with a plane surface at the rear side 27 of the reshaping optical unit 9. A further part 20 of the beam cross-section of the collimated laser beam 8 illuminates said further partial region 20 of the shaping optical unit 9. The further partial region 19 is adjacent to the partial region 15 in a direction R transverse with respect to the beam propagation direction of the collimated laser beam 8. In the embodiment shown, the reshaping optical unit 9 is adjustable in the direction R relative to the rest of the optical arrangement 1 by means of a motorized adjusting device 21.

The part 18 of the beam cross-section of the collimated laser beam 8 allotted to the partial region 15 produces a ring focus portion in the beam profile of the focused laser beam 13, and the further part 19 of the beam cross-section allotted to the partial region 19 produces a core focus portion in the beam profile of the focused laser beam 13, as is explained below.

Figures 1B, 1C:
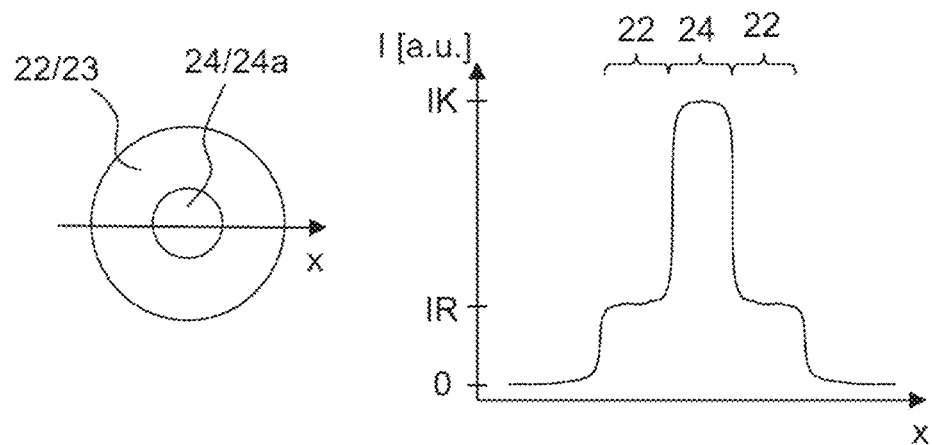
FIG. 1b shows a schematic cross section of a focused laser beam according to an embodiment of the invention.
FIG. 1c schematically shows an exemplary intensity distribution along a central sectional direction x of a focused laser beam according to an embodiment of the invention.

FIG. 1b schematically illustrates a typical beam profile of a focused laser beam such as for example can be produced by means of the optical apparatus 1 illustrated in FIG. 1a and can be utilized for laser welding on the surface of the workpiece 14.

The beam profile has at least one ring focus portion 22 which provides laser power in a (annular) ring surface 23 or a part of a (annular) ring surface. In the embodiment shown, the ring surface 23 is illuminated completely circumferentially (over 360°). Furthermore, the beam profile has a core focus portion 24 lying radially within the ring surface 23, said core focus portion making laser power available in a circular surface 24a. In the variant shown, the core focus portion 24 is adjacent to the ring focus portion 22 directly radially inwardly; alternatively, it is also possible for an intermediate zone not illuminated (or only weakly illuminated) by laser radiation to be set up between the ring focus portion and the core focus portion (not illustrated in greater detail, but cf. e.g. FIG. 4b). It should additionally be noted that alternatively a plurality of concentric ring focus portions can also be provided (not illustrated in greater detail, but see cf. FIG. 4d).

FIG. 1c illustrates in a diagram the local laser intensity I (laser power per area) as a function of the location x, along a sectional direction perpendicular to the propagation direction of the laser beam, for the beam profile from FIG. 1b. The laser intensity has a double "top hat" profile. The laser intensity within the core focus portion 24 has a substantially constant, first high value IK; the value of IK usually fluctuates around its mean value by not more than 25%. The laser intensity within the ring focus portion 22 has a substantially constant, second lower value IR; the value of IR usually fluctuates around its mean value by not more than 25%.

In the variant shown, it holds true that approximately IK=3.5*IR; it generally holds true that usually IK≥3*IR, often IK≥6*IR. For the laser power integrated over the area of the respective focus portion, it holds true here that approximately LK=LR; it generally holds true that usually LK≥0.5*(LR+LK), where LK: Integrated laser power in the core focus portion 24, and LR: integrated laser power in the ring focus portion 22 (if appropriate all ring focus portions).

Figure 2A:
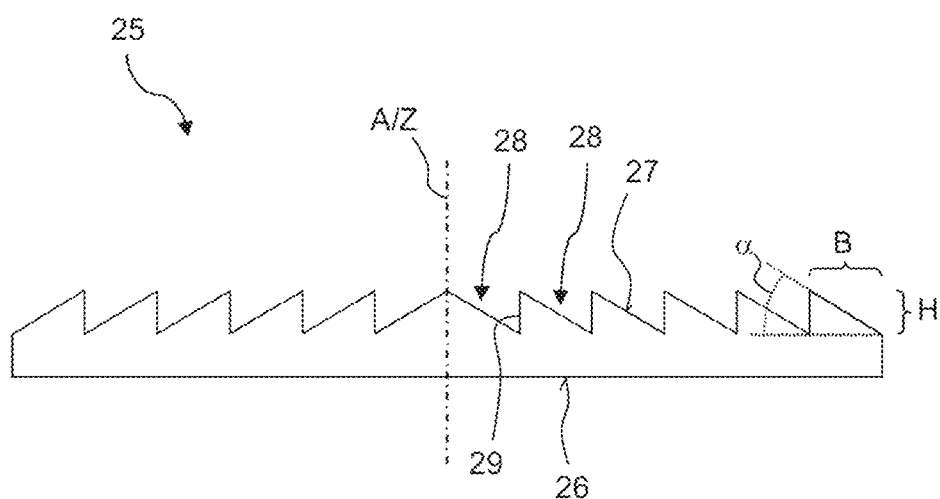
FIG. 2a schematically shows a cross-sectional profile of a diffractive axicon of a reshaping optical unit according to an embodiment of the invention, the diffractive axicon having a reduced phase modulation.

FIG. 2a shows a schematic cross section of a diffractive axicon 25 of a reshaping optical unit according to an embodiment of the invention. The axicon 25 is embodied in plane fashion on a front side 26 (incidence side for the laser beam), and at a rear side 27 (emergence side for the laser beam) is embodied with a multiplicity of ring regions 28 which are concentric with respect to a central axis A (which defines a radial center Z of the axicon 25) and have cone lateral surfaces in each case falling away from the central axis A in a radial direction R. This results in a rotationally symmetrical, periodic sawtooth grating in cross section. The cone lateral surfaces in cross section or the sawtooth have a radial width B ("grating period" of the sawtooth grating), and at the respective steps 29 between two adjacent ring regions 28 the axial thickness of the axicon 25 changes by the height H. The width B and the height H correlate with a slope angle α of the sawtooth grating in accordance with H/B=tan(a); the slope angle α of a diffractive axicon may also be referred to as "axicon angle".

In the case of a conventional axicon 25, the height H at a step 29 is typically chosen such that for the laser radiation of the (mean) wavelength λ a phase jump PHS arises at the step 29 where PHS=2π*Δn*H/λ=2π, where Δn: Difference between the refractive indices (at the wavelength λ) of the material of the axicon 25 (usually glass) and the surroundings (usually air). A phase jump PHS=2π is typically set up if the reshaping optical unit, in addition to the partial region with at least one axicon or a part thereof, is also set up with a further partial region without an axicon.

In the variant presented here, the height H of the step 29 is dimensioned such that the phase jump PHS arising at a step 29 is less than 2π, here where approximately PHS=2.5 rad ("reduced phase modulation"); PHS≤3 rad generally preferably holds true for this. The axicon 25 thus has an "incomplete" etching depth by comparison with a conventional diffractive axicon.

Figure 2B:
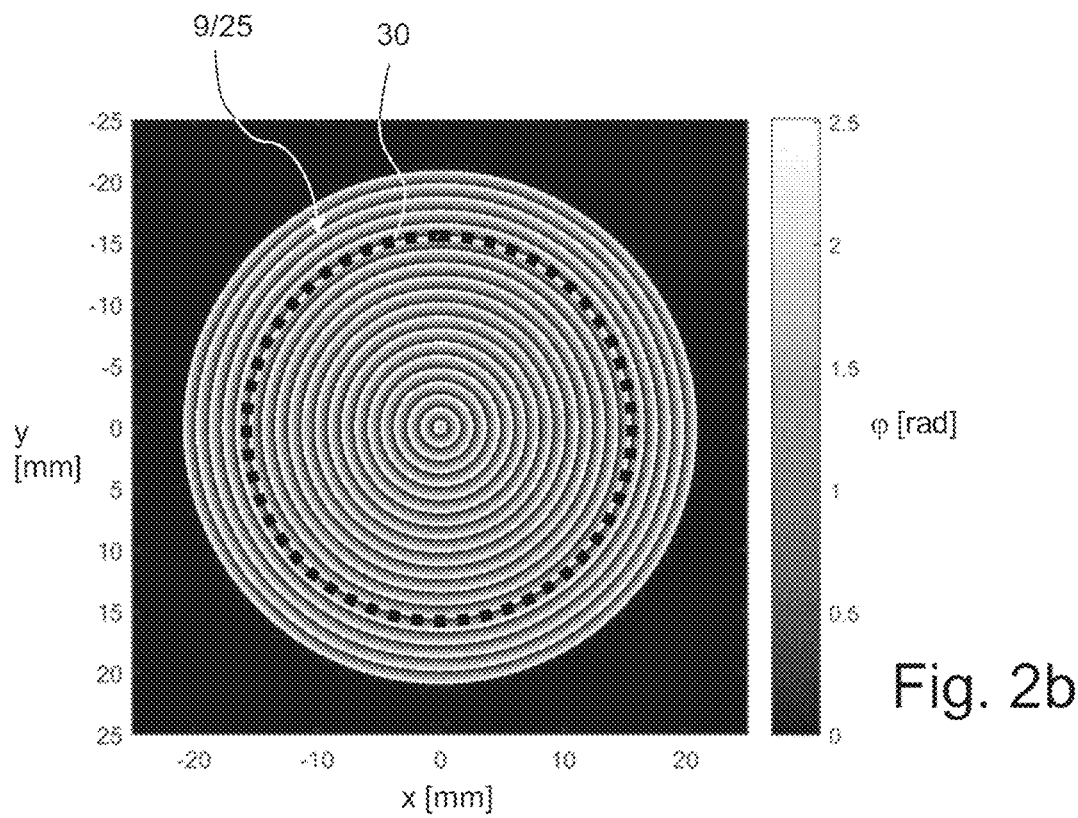
FIG. 2b schematically shows the phase shift in the cross section of a laser beam as a result of passing through a reshaping optical unit with diffractive axicon with reduced phase modulation according to FIG. 2a, according to an embodiment of the invention.

FIG. 2b illustrates by way of example the local phase change φ of a passing laser radiation, said local phase change being set up by the axicon 25 with reduced phase modulation according to FIG. 2a in the case of a reshaping optical unit 9, as a function of the location (spatial coordinates x, y) in the beam cross-section; the lightness illustrates the local phase change φ. The coverage of a typical beam cross-section 30 at the axicon 25 is depicted by way of example; the beam cross-section here lies completely within and centrally in the axicon 25. The largest phase difference of the axicon 25 at a respective step here is approximately 2.5 rad.

Figure 2C:
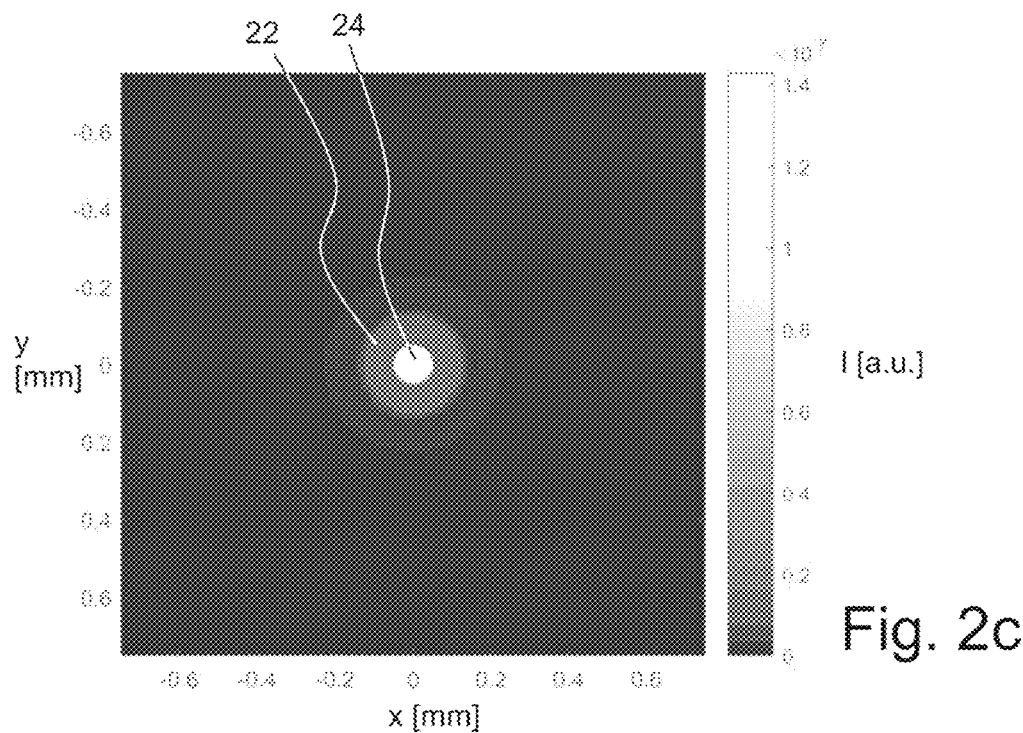
FIG. 2c schematically shows the intensity distribution in the cross section of a laser beam after the reshaping from FIG. 2b after focusing, according to an embodiment of the invention.

FIG. 2c shows the intensity I (illustrated by way of the lightness) of the focused laser beam resulting from the beam reshaping from FIG. 2b as a function of the location (spatial coordinates x, y) in the beam cross-section. As is evident from FIG. 2c, the "incomplete" phase jump at the steps 29 provides for an incomplete diffraction of the laser beam into the ring focus portion 22; however, the ring focus portion 22 is illuminated fully (over 360°) circumferentially. A considerable portion of the laser beam is not diffracted and remains undeflected as a central core focus portion 24.

Figure 3A:
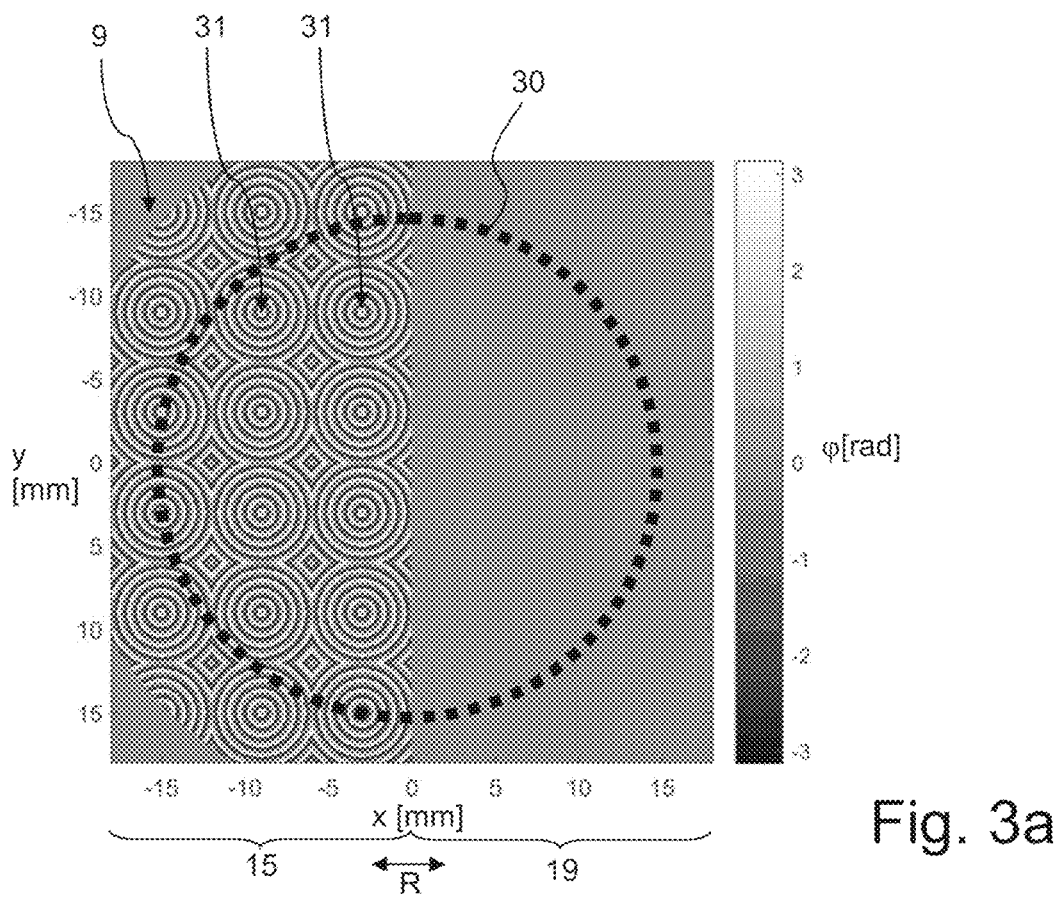
FIG. 3a schematically shows the phase shift in the cross section of a laser beam as a result of passing through a reshaping optical unit which embodies a plurality of diffractive axicons in one partial region, and embodies no axicons in a further partial region, according to an embodiment of the invention.

FIG. 3a illustrates the local phase change φ (illustrated by the lightness) in the beam cross-section 30 of a laser beam, said local phase change being set up by a reshaping optical unit 9, in a variant in which a partial region 15 of the reshaping optical unit 9 has a multiplicity of diffractive axicons 31 arranged next to one another, and in which the phase remains constant in a further partial region 19 without axicons. The diffractive axicon 31 each have phase jumps of 2π at their steps; the phase change accordingly varies between −3.14 rad and +3.14 rad. The left part (left half) of the beam cross-section 30 here illuminates the partial region 15 over a multiplicity of axicons 31, and the further right part (right half) of said beam cross-section illuminates the further partial region 19.

Figure 3B:
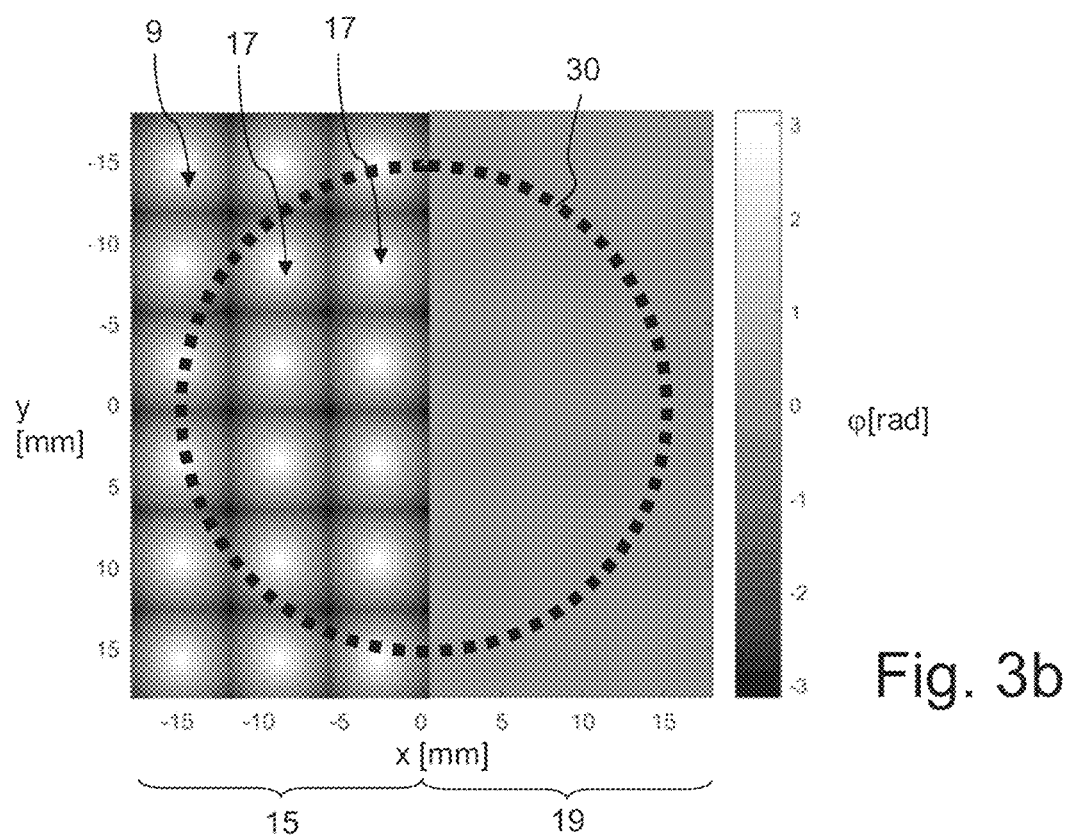
FIG. 3b schematically shows the phase shift in the cross section of the laser beam as a result of passing through a reshaping optical unit which embodies a plurality of refractive axicons on a cartesian grid in one partial region, and embodies no axicons in a further partial region, according to an embodiment of the invention.
Figure 3C:
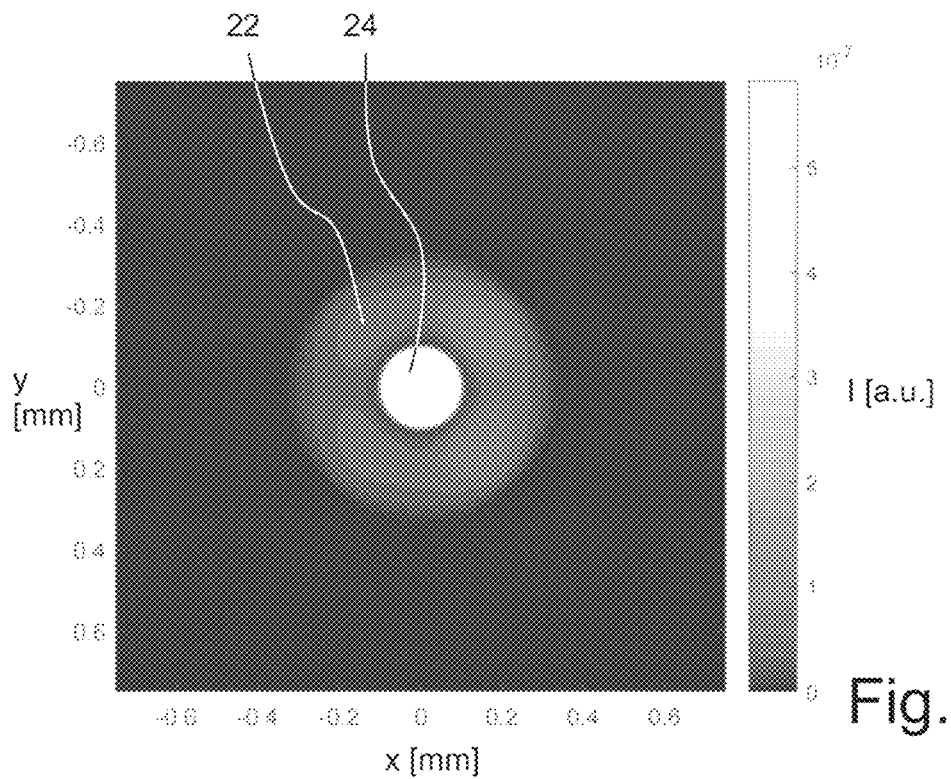
FIG. 3c schematically shows the intensity distribution in the cross section of the laser beam after the reshaping from FIG. 3a or 3b after focusing, according to an embodiment of the invention.

As is evident in the intensity image (beam profile) of the resulting focused laser beam in FIG. 3c, the illumination in the partial region 15 provides for a diffraction of the associated portion of the laser radiation into a (fully circumferential) ring focus portion 22 of the focused laser beam, and the illumination in the partial region 19 provides for an undeflected portion of the laser radiation, forming the core focus portion 24 in the focused laser radiation. The laser intensity I is illustrated here once again by way of the lightness.

By means of relative movement of the reshaping optical unit 9 with respect to the beam cross-section 30 in the direction R in FIG. 3a, it is possible to change or set the distribution of the laser power on the ring focus portion 22 and the core focus portion 24.

Instead of diffractive axicons, refractive axicons 17 arranged next to one another can also be used in the partial region 15 of the reshaping optical unit 9, as illustrated in FIG. 3b; here the local phase change φ is shown (illustrated by way of the lightness) of the reshaping optical unit 9 in the region of the beam cross-section 30 of the laser beam; the local phase change substantially corresponds to a local axial height. Once again no axicons are embodied in a further partial region 19. The refractive axicons 17 each have a (non-stepped) surface shaped as a conical lateral surface, with the local cone axis perpendicular to the plane of the drawing. A multiplicity of refractive axicons 17 are situated in the partial region 15 (in this respect, also cf. FIG. 1a).

This reshaping optical unit 9 likewise produces an intensity distribution according to the illustration in FIG. 3c. The illumination in the partial region 15 in FIG. 3b provides for a refraction of the associated portion of the laser radiation into a (fully circumferential) ring focus portion 22 of the focused laser radiation, and the illumination in the partial region 19 provides for an undeflected portion of the laser radiation, forming the core focus portion 24 in the focused laser radiation.

Figure 3D:
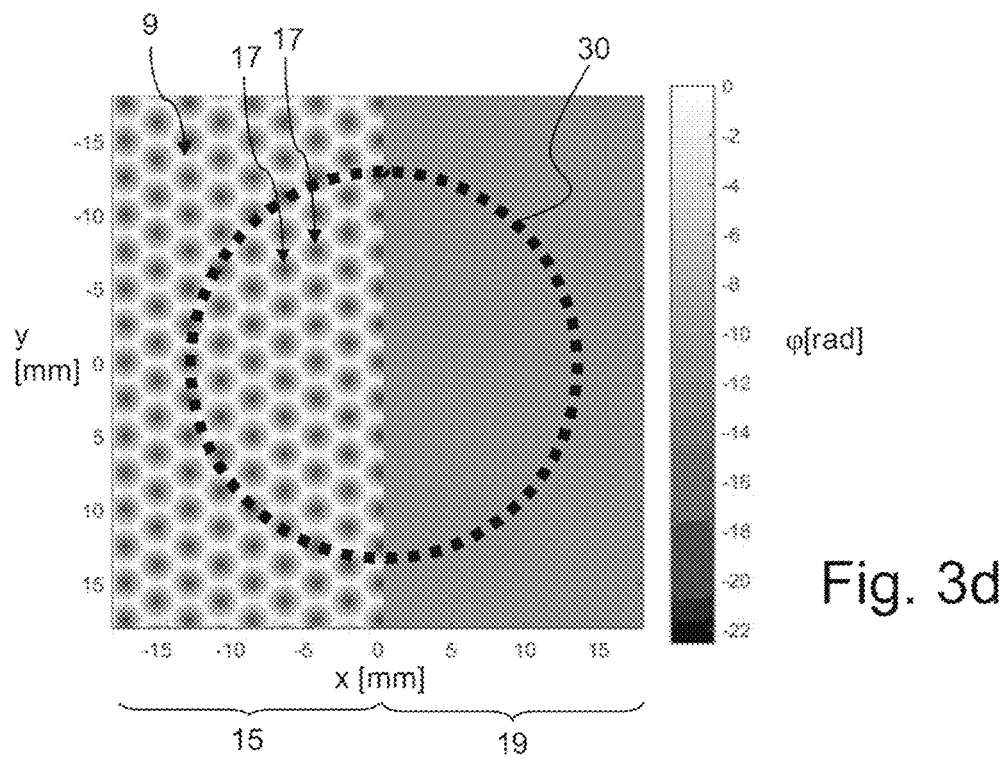
FIG. 3d schematically shows the phase shift in the cross section of the laser beam as a result of passing through a reshaping optical unit which embodies a plurality of refractive axicons on a hexagonal grid in one partial region, and embodies no axicons in a further partial region, according to an embodiment of the invention.
Figure 3E:
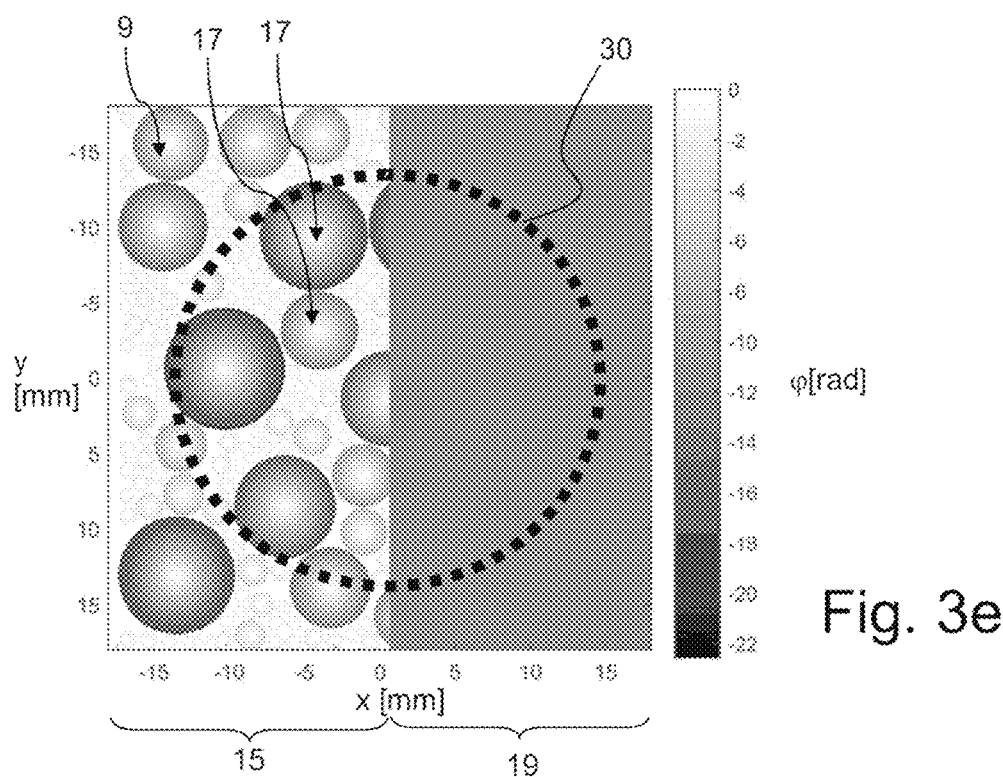
FIG. 3e schematically shows the phase shift in the cross section of the laser beam as a result of passing through a reshaping optical unit which embodies a plurality of refractive axicons in a statistical arrangement in one partial region, and embodies no axicon s in a further partial region, according to an embodiment of the invention.

In the variant in FIG. 3b, the refractive axicons 17 are arranged in a cartesian grid. It should be noted that the axicons 17 arranged next to one another in the partial region 15 of the reshaping optical unit 9 alternatively can also be arranged in a hexagonal grid; cf. the local phase change φ in the region of the beam cross-section 30 in FIG. 3d. It is likewise possible for axicons arranged next to one another in the partial region 15 of the reshaping optical unit 9 also to be arranged statically (randomly) and in this case also for axicons 17 of different sizes (but preferably with an identical axicon angle) to be chosen, cf. the local phase change φ in the region of the beam cross-section in FIG. 3e. An intensity distribution according to FIG. 3c once again arises in both cases.

Figure 4A:
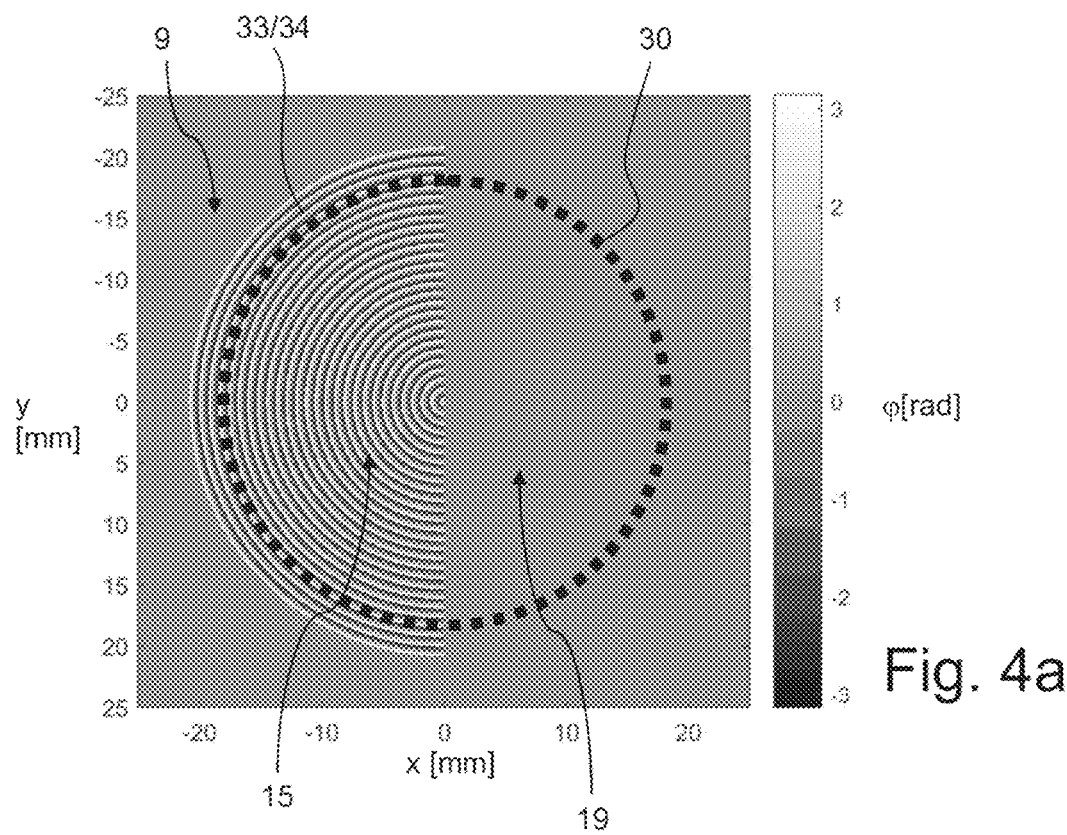
FIG. 4a schematically shows the phase shift in the cross section of a laser beam as a result of passing through a reshaping optical unit which embodies a part of a diffractive axicon encompassing 180° in one partial region, and embodies no axicons in a further partial region, according to an embodiment of the invention.

FIG. 4a shows the local phase change φ (illustrated by the lightness), set up by a reshaping optical unit 9, in the region of the beam cross-section 30 of a laser beam in a variant in which a partial region 15 of the reshaping optical unit 9 has a part 33 of a (here) diffractive axicon 34, and in which the phase remains constant in a further partial region 19. The part 33 of the axicon 34 here consists of a 180° sector of a (here not set up, complete) diffractive axicon 34, and the phase jump at steps of the diffractive axicon 34 here is 2π. The left part (left half) of the beam cross-section 30 here illuminates the partial region 15 over an inner region of the part 33 of the axicon 34, and the further right part (right half) of said beam cross-section illuminates the further partial region 19.

Figure 4B:
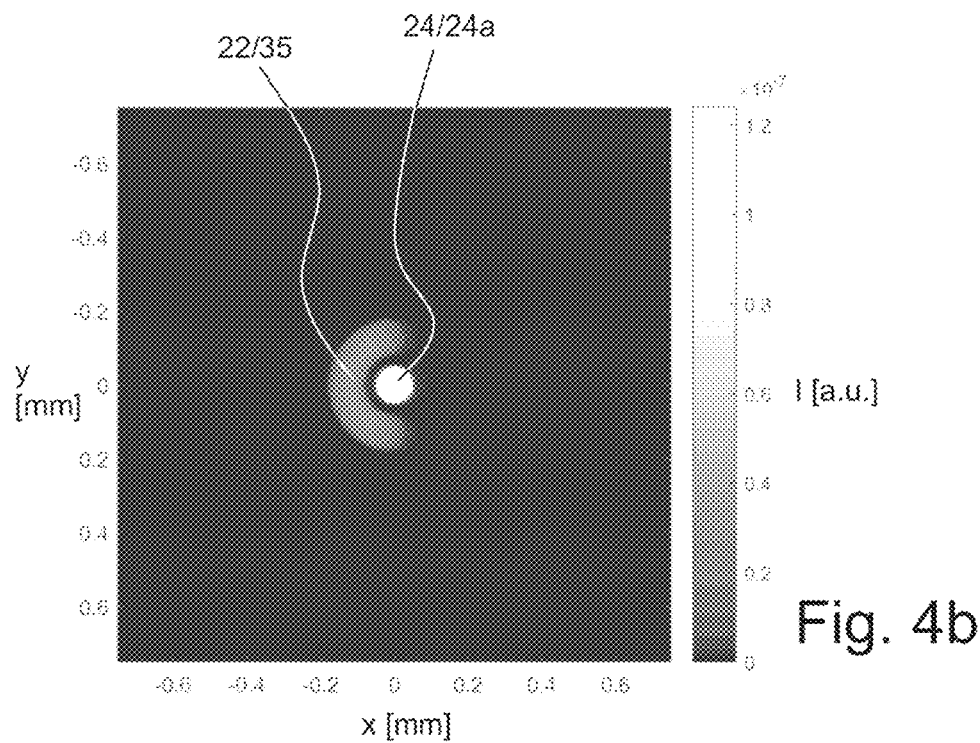
FIG. 4b schematically shows the intensity distribution in the cross section of the laser beam after the reshaping from FIG. 4a after focusing, according to an embodiment of the invention.

FIG. 4b shows the intensity I (illustrated as lightness) in the cross section of the resulting focused laser beam. The part of the beam cross-section 30 which is allotted to the partial region 15 of the part 33 of the axicon 34 in FIG. 4a produces a ring focus portion 22 corresponding to a part of a ring surface 35, namely a half of a ring surface corresponding to half a revolution (or an angle range of 180°). The further part of the beam cross-section 30 from FIG. 4a, allotted to the further partial region 19, results in a core focus portion 24 that fills a circular surface 24a completely and approximately uniformly.

Figure 4C:
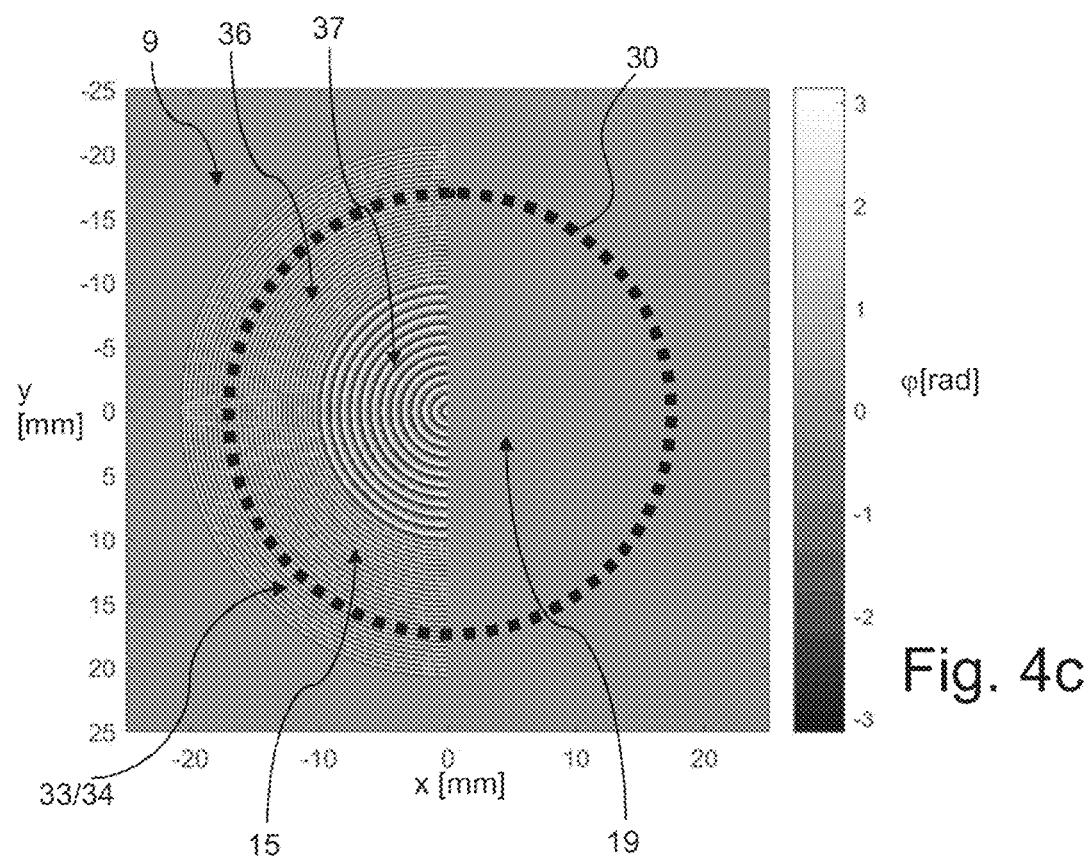
FIG. 4c schematically shows the phase shift in the cross section of a laser beam as a result of passing through a reshaping optical unit which embodies a part of a diffractive axicon encompassing 180° in one partial region, wherein the grating period in an inner zone of the axicon is greater than that in an outer zone of the axicon, and wherein the reshaping optical unit embodies no axicons in a further partial region, according to an embodiment of the invention.
Figure 4D:
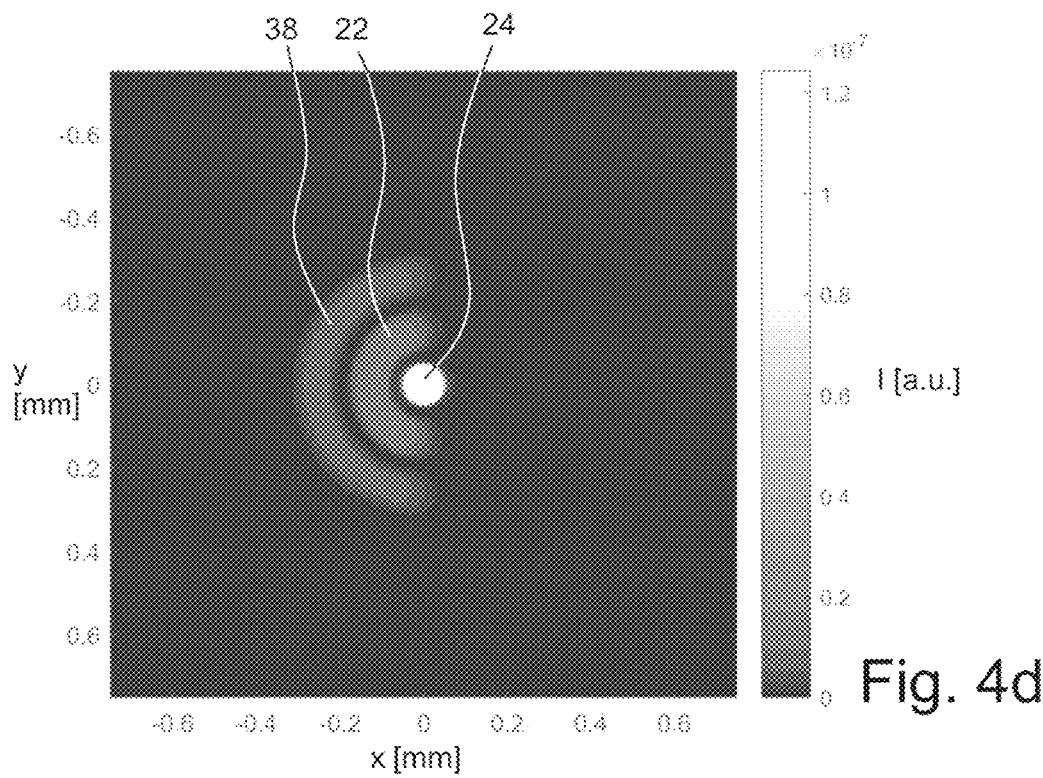
FIG. 4d schematically shows the intensity distribution in the cross section of the laser beam after the reshaping from FIG. 4c after focusing, according to an embodiment of the invention.

If in the reshaping optical unit 9 in the part 33 of the diffractive axicon 34 the grating period of the ring regions changes from a first zone 36 to a second zone 37, as illustrated in in FIG. 4c, then in the cross section of the focused laser beam this results in a plurality of ring focus portions 22, 38 at different radial positions, as illustrated in the intensity image in FIG. 4d; the ring focus portions 22, 38 each sweep over a semicircular arc of 180°, corresponding to the realized part 33 of the axicon 34. It should be noted that in both zones 36, 37 the grating period correlates with a slope angle ("axicon angle" in the case of the diffractive axicon) of the ring region, which angle thus changes from zone 36, to zone 37.

Figure 4E:
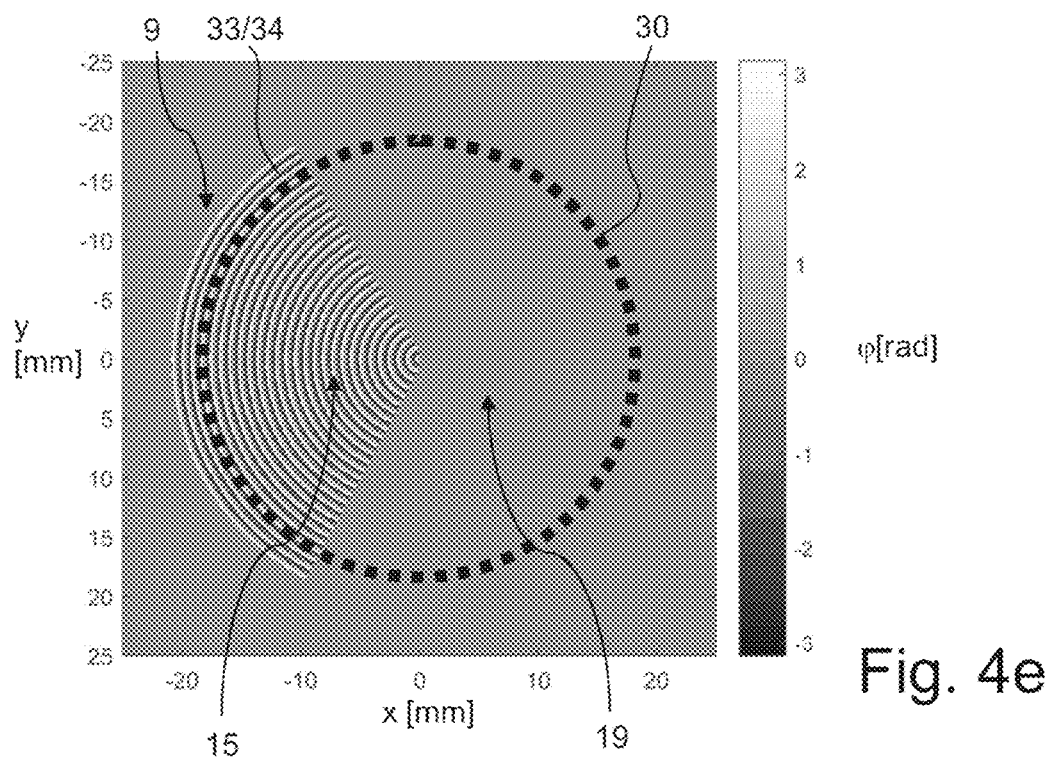
FIG. 4e schematically shows the phase shift in the cross section of a laser beam as a result of passing through a reshaping optical unit which embodies a part of a diffractive axicon encompassing 120° in one partial region, and embodies no axicons in a further partial region, according to an embodiment of the invention.
Figure 4F:
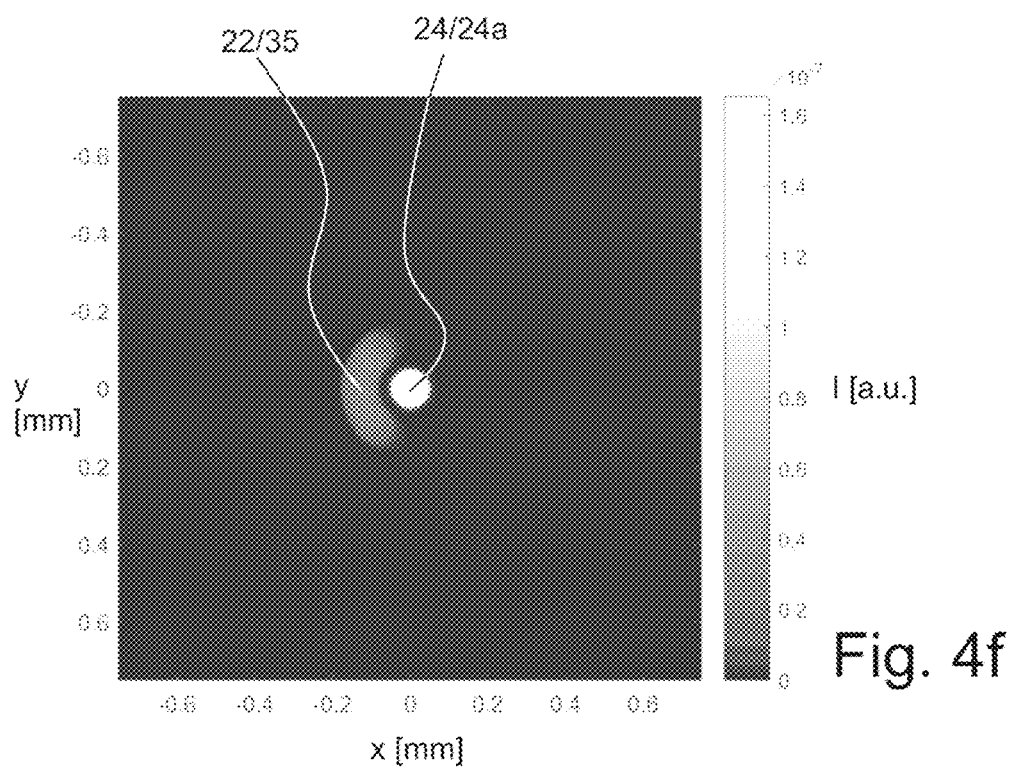
FIG. 4f schematically shows the intensity distribution in the cross section of the laser beam after the reshaping from FIG. 4e after focusing, according to an embodiment of the invention.

If in the reshaping optical unit 9 the part 33 of the diffractive axicon 34 through a 120° sector of the (here not set up, complete) diffractive axicon 34 is chosen, onto which the partial region 15 of the beam cross-section 30 is directed, as illustrated in FIG. 4e, then the intensity I in the cross section of the resulting laser beam exhibits a ring focus portion 22 corresponding to a corresponding part of a ring surface 35, here a third of a ring surface corresponding to the third of a revolution (or an angle range of 120°), cf. FIG. 4f. The further part of the beam cross-section 30 from FIG. 4e, allotted to the further partial region 19, results in the core focus portion 24.

Figure 5A:
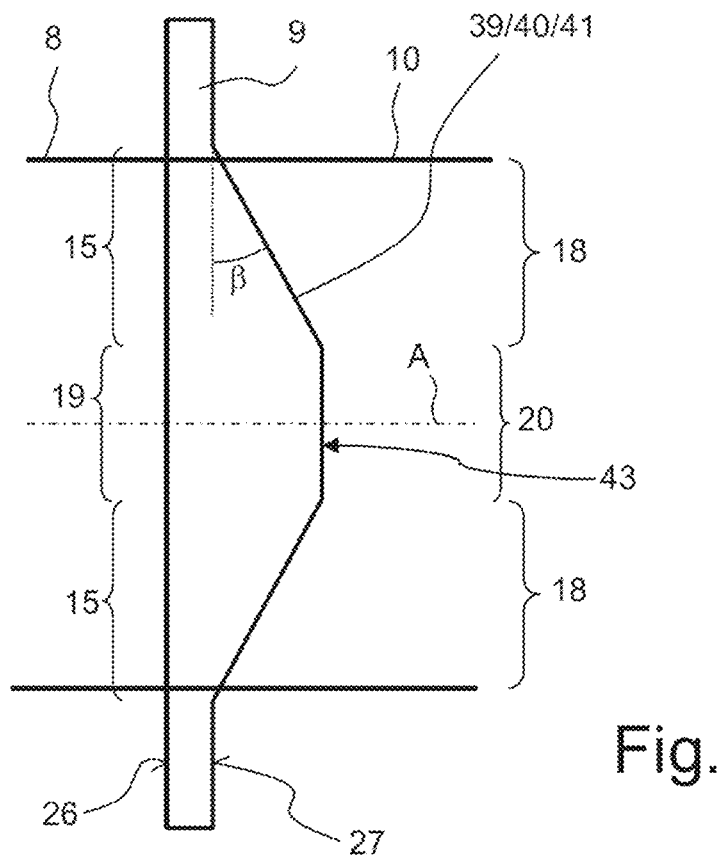
FIG. 5a shows a schematic longitudinal section of a reshaping optical unit for the invention which embodies a ring-shaped part of a refractive axicon, and is embodied in plane fashion in a region in the center of the ring-shaped part, according to an embodiment of the invention.

FIG. 5a illustrates the reshaping optical unit 9 according to an embodiment of the invention in longitudinal section, in the case of which the reshaping optical unit 9 embodies a ring-shaped (rotationally symmetrical) part 39 of a refractive axicon 40 in a ring-shaped partial region 15. In the ring-shaped partial region 15, the reshaping optical unit 9, at the rear side 27, is embodied with a truncated cone 41 around an axis (cone axis) A; in this case, the cone angle ("axicon angle" in the case of the refractive axicon) of the truncated cone 41 determines the angle at which the ring focus portion is obtained in the shaped laser beam 10 and also in the focused laser beam. In a region 43 radially within the part 39 around the axis A, the rear side 27 of the reshaping optical unit 9 is embodied in plane fashion in a further partial region 19; the partial region 19 is thus absent for a complete refractive axicon 40.

The collimated laser beam 8 is directed onto the front side 26 of the reshaping optical unit 9 coaxially with respect to the axis A, and here for the most part illuminates the part 39 of the axicon 40, specifically in a rotationally symmetrical manner. The collimated laser beam 8 impinges on the part 39 of the axicon 40 with a ring-shaped part 18 of its beam cross-section, as a result of which this part 18 of the beam cross-section is deflected and the ring focus portion is obtained in the focused laser beam; the ring focus portion is illuminated fully circumferentially (not illustrated, but in this respect cf. FIG. 1b). With a further part 20 of its beam cross-section, the collimated laser beam 8 illuminates the plane, further partial region 19, i.e. a region 44 radially outside the part 39, and accordingly remains undeflected; this results in the core focus region in the focused laser beam (not illustrated, but in this respect cf. FIG. 1b).

Figure 5B:
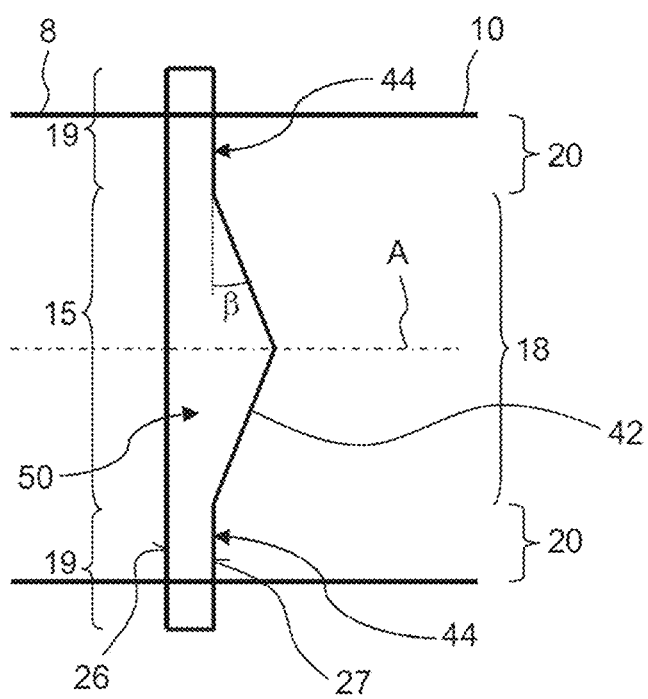
FIG. 5b shows a schematic longitudinal section of a reshaping optical unit for the invention which embodies a refractive axicon in one partial region, said refractive axicon being illuminated by one part of the beam cross-section of the laser beam, and wherein a further part of the beam cross-section radially around the refractive axicon illuminates a plane, ring-shaped further partial region of the reshaping optical unit, according to an embodiment of the invention.

FIG. 5b shows a reshaping optical unit 9 according to an embodiment of the invention, in the case of which the reshaping optical unit 9, at the rear side 27, embodies a complete cone lateral surface around the axis A, and accordingly embodies a complete refractive axicon 42 in a partial region 15. In a ring-shaped, outer, further partial region 19, the rear side 27 of the reshaping optical unit 9 is embodied in plane fashion. The axicon 42 here thus protrudes with a cone-shaped projection from an otherwise plane substrate (glass substrate) 50 of the reshaping optical unit 9. A collimated laser beam 8 incident at the front side of the reshaping optical unit 9 coaxially with respect to the axis A illuminates the complete axicon 42 rotationally symmetrically.

A first part 18 of the beam cross-section of the collimated laser beam 8 is allotted to the partial region 15 or the axicon 42, as a result of which this part 18 of the beam cross-section is deflected and a ring focus portion is obtained in the focused laser beam; the ring focus portion is illuminated fully circumferentially (not illustrated, in this respect cf. FIG. 1b). A further, ring-shaped part 20 of the beam cross-section of the collimated laser beam 8 is allotted to the surrounding further partial region 19, as a result of which this part 20 of the beam cross-section remains undeflected and results in a core focus portion in the focused laser beam (not illustrated, but in this respect cf. FIG. 1b).

Figure 5C:
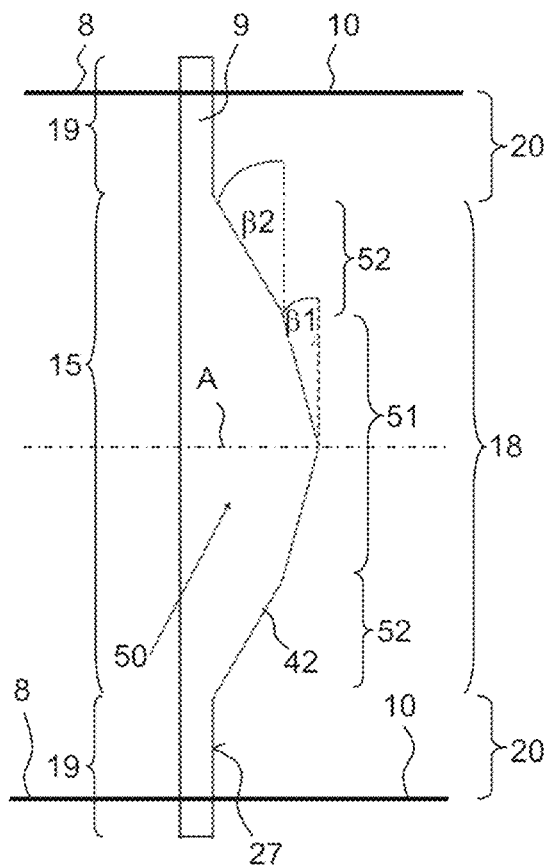
FIG. 5c shows a schematic longitudinal section of a reshaping optical unit for the invention which is embodied with a refractive axicon in which two different axicon angles are set up, according to an embodiment of the invention.

FIG. 5c illustrates a reshaping optical unit 9 according to an embodiment of the invention in longitudinal section, similar to the design from FIG. 5b, such that only the essential differences are explained. Refractive axicon 42 here has a first axicon angle range 51, in which the axicon angle is β1; said first axicon angle range 51 here lies radially inward with respect to the axis A. Furthermore, the axicon 42 has a second axicon angle range 52, in which the axicon angle is β2; said second axicon angle 52 lies outward around the first axicon angle range 51. In this case β2>β1 is chosen here. The collimated laser beam 8 illuminates both axicon angle ranges 51, 52 of the axicon 42 simultaneously with its part 18 of the beam cross-section, which results in two ring focus portions in the focused laser beam; the partial region 20 in turn results in a core focus portion (not illustrated).

Figure 5D:
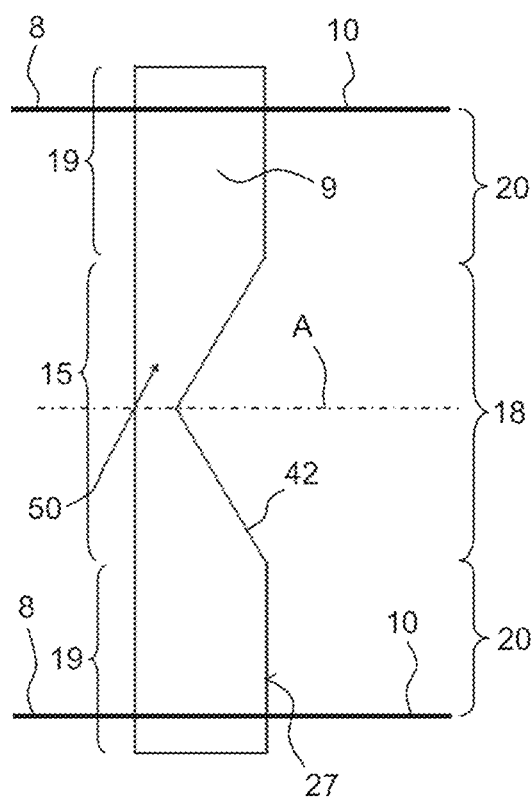
FIG. 5d shows a schematic longitudinal section of a reshaping optical unit for the invention which is embodied with a refractive axicon which is embodied as a depression in a substrate, according to an embodiment of the invention.

FIG. 5d likewise illustrates a reshaping optical unit 9 according to an embodiment of the invention in longitudinal section, similar to the design from FIG. 5b, such that once again only the essential differences are explained. The refractive axicon 42 is embodied here, at the rear side 27 of the reshaping optical unit 9, by a depression 53 shaped as a cone lateral surface in the substrate (glass substrate) 50; this design of the axicon 42 is also referred to as an "inverse axicon", which can be applied within the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 optical apparatus
2 fiber-optic cable
3 end of the fiber-optic cable
4 provided laser beam
5 laser beam source
6 Collimation optical unit
7 Collimation lens
8 Collimated laser beam
9 reshaping optical unit 10 reshaped laser beam
11 focusing optical unit
12 Focusing lens
13 focused laser beam
14 Workpiece
15 partial region
16 local cone axis of a refractive axicon
17 refractive axicon
18 part of the beam cross-section
19 further partial region
20 further part of the beam cross-section
21 adjusting device
22 ring focus portion
23 ring surface
24 core focus portion
24a circular surface
25 diffractive axicon
26 front side
27 rear side
28 ring region of the diffractive axicon
29 step
30 beam cross-section
31 diffractive axicons
33 part of a diffractive axicon
34 diffractive axicon
35 part of the ring surface
36 first zone of the diffractive axicon
37 second zone of the diffractive axicon
38 ring focus portion
39 (rotationally symmetrical) part of an axicon
40 refractive axicon
41 truncated cone
42 refractive axicon
43 (radially inner) region
44 (radially outer) region
50 substrate
51 first axicon angle range
52 second axicon angle range
53 depression
A axis
B width of the ring region/grating period of the diffractive axicon
H height of the step
I intensity
R direction (radially/transversely with respect to the beam propagation direction)
x spatial coordinate
y spatial coordinate
Z center
α slope angle/axicon angle in the diffractive axicon
β, β1, β2 cone angle/axicon angle in the refractive axicon
φ local phase change as a result of reshaping optical unit

The invention claimed is:

1. A method for laser welding of a workpiece, the method comprising:
providing a laser beam using a laser beam source,
collimating the laser beam using a collimation optical unit,
reshaping the collimated laser beam using a reshaping optical unit, and
focusing the reshaped laser beam using a focusing unit, the focused laser beam being directed onto the workpiece to be welded,
wherein
the reshaping optical unit has a first partial region in which at least one part of at least one axicon is embodied,
at least a part of a beam cross-section of the collimated laser beam is directed onto the first partial region of the reshaping optical unit,
the collimating the laser beam and the reshaping the collimated laser beam are performed such that the focused laser beam has
a core focus portion provided by laser radiation not diffracted or not refracted at the reshaping optical unit, and
at least one ring focus portion surrounding the core focus portion on a ring surface or a part of the ring surface,
wherein the ring focus portion is provided by laser radiation diffracted or refracted at the at least one axicon, and the reshaping optical unit has a second partial region adjacent to the first partial region in a direction R, the reshaping optical unit is moved relative to the collimated laser beam in the direction R to set a distribution of a laser power between the core focus portion and the at least one ring focus portion.

2. The method as claimed in claim 1, wherein an integrated laser power of the core focus portion is at least 25% of the laser power of the focused laser beam.

3. The method as claimed in claim 1, wherein the at least one axicon comprises a diffractive axicon,
wherein the collimated laser beam illuminates the diffractive axicon with an entire beam cross-section thereof, and
wherein the diffractive axicon subjects the collimated laser beam to a reduced phase modulation with an incomplete diffraction of the collimated laser beam, so that the not diffracted or not refracted core focus portion is produced.

4. The method as claimed in claim 3, wherein the collimated laser beam illuminates the diffractive axicon rotationally symmetrically around a center of the diffractive axicon.

5. The method as claimed in claim 3, wherein, to set up the reduced phase modulation, the diffractive axicon has concentric ring regions arranged periodically around a center of the diffractive axicon and having, in each concentric ring region, cone lateral surfaces rising or falling in a radial direction, wherein at a respective step between two adjacent ring regions, an axial thickness of the diffractive axicon changes by a height H such that a phase jump (PHS) of less than $2\pi$ is set up at the respective step.

6. The method as claimed in claim 5, wherein $\pi/2 \leq PHS \leq 3\pi/2$.

7. The method as claimed in claim 1, wherein the first partial region of the reshaping optical unit has a multiplicity of axicons arranged next to one another,
wherein the part of the beam cross-section of the collimated laser beam wholly or partly illuminates a plurality of the axicons of the first partial region, and
wherein a further part of the beam cross-section of the collimated laser beam remains uninfluenced by the axicons.

8. The method as claimed in claim 7, wherein the axicons arranged next to one another are refractive axicons.

9. The method as claimed in claim 1, wherein the first partial region has only a part of one axicon of the at least one axicon,
the part of the beam cross-section of the collimated laser beam wholly or partly illuminates the part of the one axicon,
and wherein a further part of the beam cross-section remains uninfluenced by the part of the one axicon.

10. The method as claimed in claim 9, wherein the part of the one axicon is a sector-shaped part of the one axicon, wherein the sector-shaped part encompasses an angle range of between 90° and 270°.

11. The method as claimed in claim 1, wherein the first partial region comprises only one axicon or only a part of the one axicon,
   wherein the part of the beam cross-section which is directed onto the first partial region illuminates the one axicon or the part of the one axicon rotationally symmetrically, and wherein a further part of the beam cross-section remains uninfluenced by the one axicon or the part of the one axicon.

12. The method as claimed in claim 11, wherein the further part of the beam cross-section comprises a region radially within a ring-shaped part of the one axicon and/or a region radially outside the one axicon or the part of the one axicon.

* * * * *